United States Patent [19]

Abu-Amara et al.

[11] Patent Number: 5,886,907
[45] Date of Patent: Mar. 23, 1999

[54] METHOD AND SYSTEM FOR MODELING AGGREGATE MULTIMEDIA TRAFFIC WITHIN A SHARED TRANSMISSION MEDIUM

[75] Inventors: Hosame Hassan Abu-Amara, Richardson; Venkat Kotamarti, Dallas, both of Tex.

[73] Assignee: Northern Telecom Limited, Montreal, Canada

[21] Appl. No.: 775,158

[22] Filed: Dec. 31, 1996

[51] Int. Cl.[6] .................................................. G08C 15/00
[52] U.S. Cl. ..................... 364/578; 364/514 A; 370/232; 370/253
[58] Field of Search ................................ 364/578, 514 C, 364/514 A; 370/60.1, 260, 395, 473, 474, 229, 231, 232, 234, 235, 253; 395/527, 561, 568; 379/112; 455/67.1

[56] References Cited

U.S. PATENT DOCUMENTS

| | | | |
|---|---|---|---|
| 5,490,140 | 2/1996 | Abensour et al. | 370/60.1 |
| 5,555,244 | 9/1996 | Gupta et al. | 370/60.1 |
| 5,583,792 | 12/1996 | Li et al. | 364/514 C |
| 5,764,740 | 6/1998 | Holender | 379/112 |
| 5,794,128 | 8/1998 | Brockel et al. | 455/67.1 |
| 5,812,534 | 9/1998 | Davis et al. | 370/260 |

OTHER PUBLICATIONS

By S. Behera et al., "Performance Evaluation of ATM Architectures in Multimedia Traffic Environments", IEEE, Proceedings of the 1991 Winter Simulation Conference, pp. 695–704.
By E. Saulnier, "A Hi–Lo Markov Chain Model for Multimedia Traffic in ATM Networks", Globecom '92: IEEE Global Telecommunications Conference, pp. 1450–1454.
By A. Tarraf et al., "Characterization of Packetized Voice Traffic in ATM Networks Using Neural Networks", Globecom '93: IEEE Global Telecommunications Conference, pp. 996–1000.
By U. Varshney et al., "Performance Evaluation of Multimedia local ATM Network (MLAN) Protocol", IEEE, MILCOM '93, Jul. 1993, pp. 308–312.
By C. Chou et al., "Efficient Computation of End–to–End Performance Measures for Multi–Link ATM Networks with Multi–Media Traffic", IEEE INFOCOM '95, pp. 170–178.

(List continued on next page.)

*Primary Examiner*—Kevin J. Teska
*Assistant Examiner*—Russell W. Frejd
*Attorney, Agent, or Firm*—John D. Crane; Andrew J. Dillon

[57] ABSTRACT

The method and system of the present invention can be utilized to model aggregate multimedia traffic within a shared transmission medium, such as an ATM network, so that customer expectations can be met and the network can be constructed and utilized efficiently. A total number of different traffic services, as well as a maximum number of sources of each service are specified by a network operator. Next, a quality of service characterization for each service is determined, based upon available standards. Average sojourn time for each service is determined by modeling each Constant Bit Rate (CBR) service as a Renewal Process, each Variable Bit Rate (VBR) real-time service as a multistate Modulated Discrete Process and each Variable Bit Rate (VBR) non-real-time service as an On-Off Process. Sojourn mean times can thereafter be obtained from measurements or published standards. Average usage rates are then determined from the average sojourn time and that average sojourn time is then calculated for each system state. The steady state probability that a particular number of calls are in progress for each service type can then be statistically calculated utilizing the foregoing parameters. By utilizing the determined sojourn times, average usage rates and steady state probability that a particular number of calls are in progress for each service type and accurate multimedia traffic model can be provided for network design.

16 Claims, 3 Drawing Sheets

OTHER PUBLICATIONS

By T. Maples et al., "Enhancing the Performance of C3 Traffic in a Real–Time, Distributed Ada Application Through the Use of Scheduling Algorithms", IEEE MILCOM '95, Universal Communications Conference Record, Jul. 1995, pp. 901–905.

By D. McKenzie, "Performance of an ATM Network with Multimedia Traffic—A Simulation Study", IEEE, Broadcasting Convention, 1995 (IEE Conf. Pub. 413), pp. 263–268.

By S. Kumar et al., "An Access Protocol for Supporting Multiple Classes of Service in a Local Wireless Environment", IEEE Transactions on Vehicular technology, vol. 45, No. 2, May 1996, pp. 288–302.

By Z. Fan et al., "Effective bandwidth approach to connection admission control for multimedia trafic in ATM networks", IEEE, Electronics Letters, Aug. 1996, vol. 32, No. 16, pp. 1438–1439.

METHOD AND SYSTEM FOR MODELING AGGREGATE MULTIMEDIA TRAFFIC WITHIN A SHARED TRANSMISSION MEDIUM

BACKGROUND OF THE INVENTION

1. Technical Field

The present invention relates in general to improvements in network design and in particular to improvements in methods and systems for modeling aggregate multimedia traffic within a network. Still more particularly, the present invention relates to a method and system for determining sojourn times, average usage rates and a steady state probability that a particular number of calls are in progress for each type of service so that network usage may be accurately modeled for design purposes.

2. Description of the Related Art

No where has the explosion of modern technology been more evident than in the field of communication. The number and type of communication services has been rapidly expanding, including so-called "multimedia" services such as video teleconferencing, video/movies on demand and the like.

The intermixing of these multimedia services with traditional data and voice communications within a shared transmission medium has presented various design problems. Early attempts at accommodating multimedia within a shared transmission medium involved an educated guess as to the percentage of the bandwidth to be allotted to multimedia traffic and that percentage of the bandwidth was fixed thereafter, resulting in an under or over utilization of the transmission medium, if the initial assumptions were not precise or if the nature and quantity of the multimedia traffic varied.

More recently, attempts have been made at statistically modeling aggregate traffic which originates from homogeneous services with similar traffic types and similar characteristics. For example, the Poisson Process is widely utilized to model aggregate traffic from voice sources. Similarly, the Discrete Auto Regressive Process has been utilized to model aggregate traffic from video teleconferencing sources. The Markov Modulated Poisson Process is often utilized to model aggregate traffic from data sources. While these techniques are useful design aides in networks having multiple homogeneous sources of similar traffic types and characteristics, none of these techniques can be utilized to accurately model a network having aggregate traffic from heterogeneous multimedia sources.

Those skilled in the art will thus appreciate if a method and system can be provided which can accurately model aggregate traffic from heterogenous multimedia sources within a shared transmission medium, bandwidth utilization within the transmission medium can be efficiently utilized and customer satisfaction and network effectiveness can be enhanced.

SUMMARY OF THE INVENTION

It is therefore one object of the present invention to provide an improved method and system for design.

It is another object of the present invention to provide an improved method and system for modeling aggregate multimedia traffic within a network.

It is yet another object of the present invention to provide an improved method and system for determining sojourn times, average usage rates and a steady state probability that a particular number of calls are in progress for each type of service so that network usage may be accurately modeled.

The foregoing objects are achieved as is now described. The method and system of the present invention can be utilized to model aggregate multimedia traffic within a shared transmission medium, such as an ATM network, so that customer expectations can be met and the network can be constructed and utilized efficiently. A total number of different traffic services, as well as a maximum number of sources of each service are specified by a network operator. Next, a quality of service characterization for each service is determined, based upon available standards. Average sojourn time for each service is determined by modeling each Constant Bit Rate (CBR) service as a Renewal Process, each Variable Bit Rate (VBR) real-time service as a multi-state Modulated Discrete Process and each Variable Bit Rate (VBR) non-real-time service as an On-Off Process. Sojourn mean times can thereafter be obtained from measurements or published standards. Average usage rates are then determined from the average sojourn time and that average sojourn time is then calculated for each system state. The steady state probability that a particular number of calls are in progress for each service type can then be statistically calculated utilizing the foregoing parameters. By utilizing the determined sojourn times, average usage rates and steady state probability that a particular number of calls are in progress for each service type and accurate multimedia traffic model can be provided for network design.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
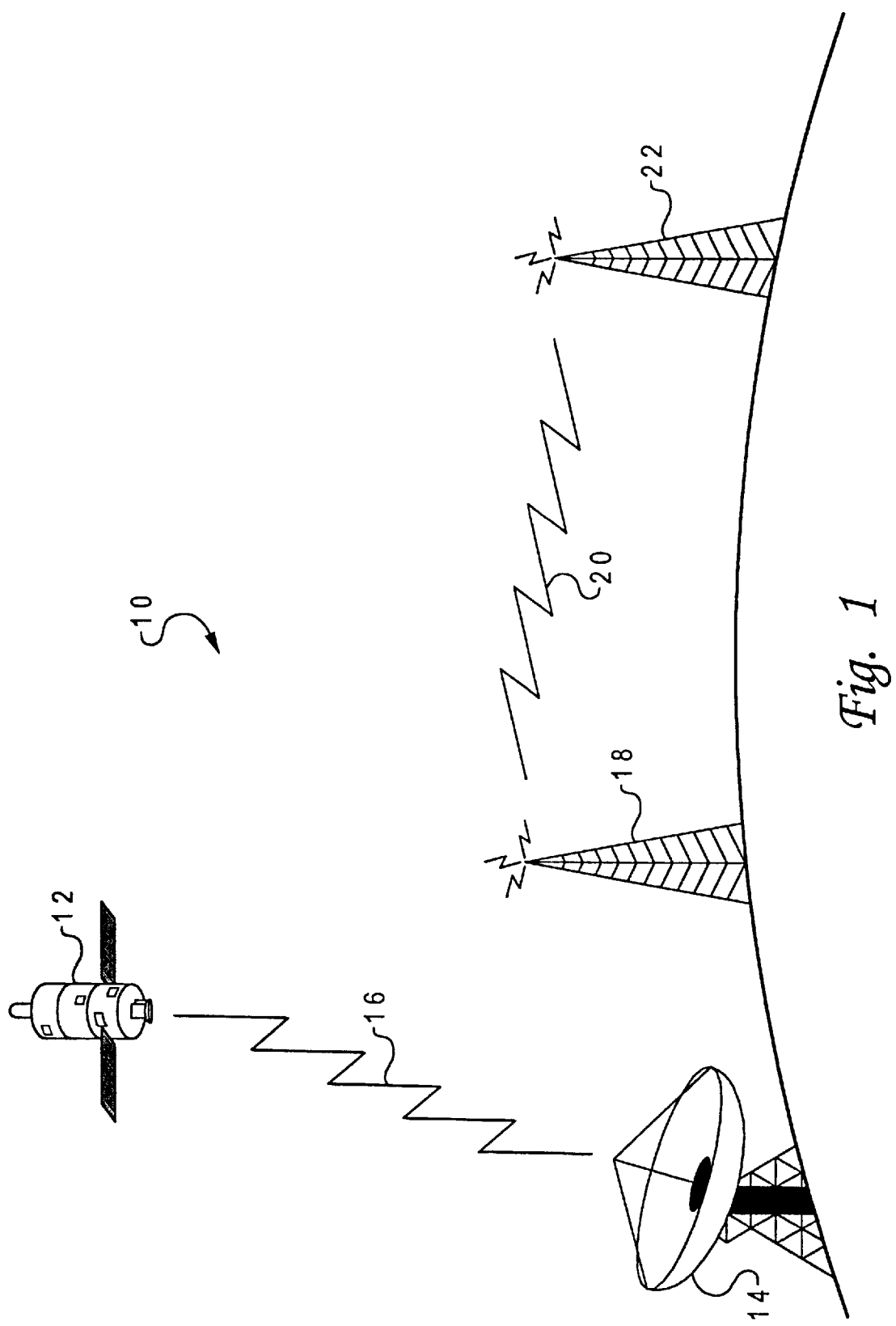
FIG. 1 is a schematic representation of a communication network which can incorporate multimedia traffic within a shared transmission medium.

With reference now to the figures and in particular with reference to FIG. 1, there is depicted a schematic representation of a communication network which incorporates multimedia traffic within a shared transmission medium. As illustrated, communication network 10 may include multiple transmission sources and receivers coupled together utilizing various transmission medium. For example, one type of network which may advantageously utilize the method and system of the present invention, is an ATM network which is utilized in conjunction with satellite communication. Thus, satellite 12 may communicate with earth station 14 over transmission medium 16. Similarly, transmission tower 18 may communicate with transmission tower 22 over transmission medium 20. Of course, those skilled in the art will appreciate that transmission medium 16 will comprise a high frequency wide bandwidth radio frequency transmission medium; however, the method and system of the present invention will find application in any system in which aggregate multimedia traffic will occupy a shared transmission medium, such as, for example, a fiber optic transmission medium.

Figure 2:
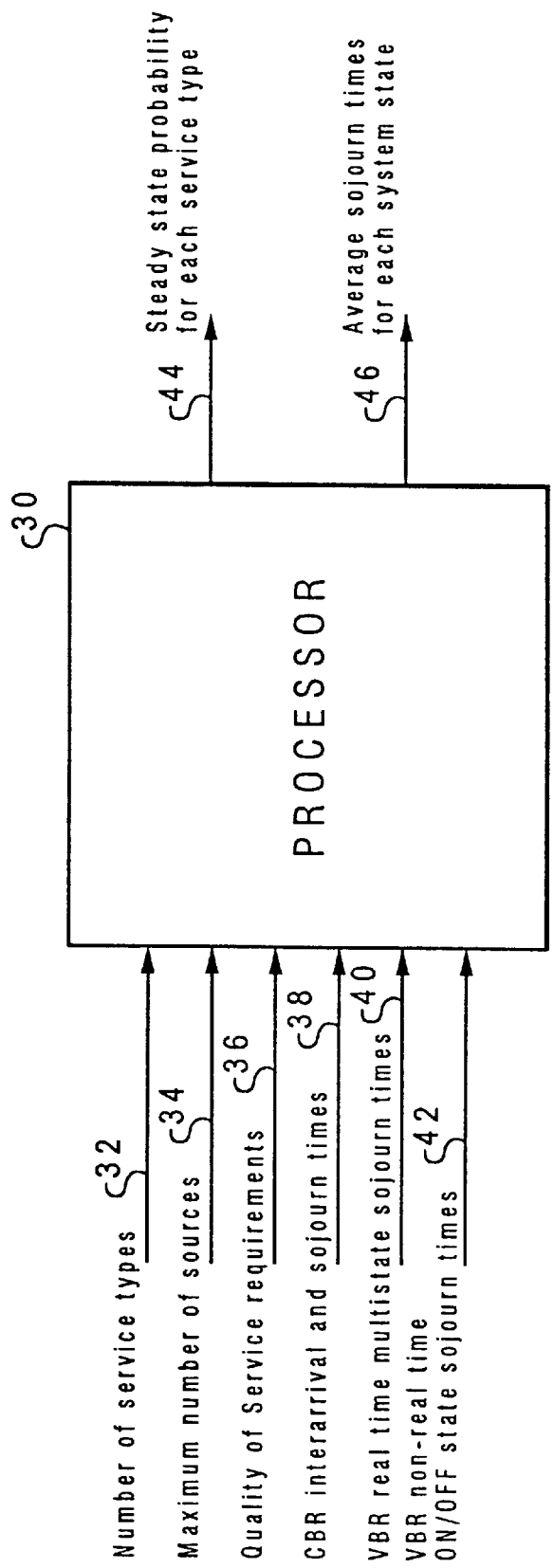
FIG. 2 is a high level block diagram of a system for modeling aggregate multimedia traffic within a shared transmission medium.

Referring now to FIG. 2, there is depicted a high level block diagram of a system for modeling aggregate multimedia traffic within a shared transmission medium in accordance with the present invention. As illustrated, the system depicted in FIG. 2 utilizing, as its central element, processor 30. Processor 30 may compromise an appropriately programmed computer such as a personal computer, workstation or other suitable computer possessing sufficient processor assets and processing capability to create the model which will be described herein.

Those skilled in the art will appreciate that in order to provide an accurate model for aggregate multimedia traffic within a shared transmission medium, it is necessary to accurately describe the various types of aggregate traffic which originate from the heterogeneous sources which may include widely diverse traffic types and characteristics. Thus, it i important to generate appropriate parameters for the model so that those parameters may be utilized as an input to a network design tool.

As depicted, processor 30 utilizes six different inputs to generate two different outputs. Input 32, as depicted within FIG. 2, comprises the total number of different types of telecommunication traffic within the transmission medium. This number is typical provided by the network operator or the design engineer specifying a particular network. Each type of telecommunication traffic is referred to herein as "service". These services may include voice, data, teleconferencing, video on demand and other similar communication types.

Next, as specified at input 34, the maximum number of sources for each service are also utilized as an input. The maximum number of sources is specified by the network operator or network designer. Thus, a network designer will typically specify the maximum number of subscribers for each type of service which is desired to be accommodated within the network.

Next, input 36 comprises the quality of service requirements for each service. That is, a specification of the maximum cell loss rate, the maximum delay for a cell traversing the network and the maximum jitter (delay variation) that each cell may experience during network traversal. These quality of service values may be obtained from the appropriate international standards bodies such as the International Telecommunication Union-Telecommunication (ITU-T).

Next, as depicted at input 38, for each Constant Bit Rate (CBR) service, a specification of the interarrival and sojourn times is necessary. These values can also be obtained from standards bodies such as the ITU-T or may be obtained from measurements or a review of research literature.

Next, input 40 comprises a specification of the sojourn times for each Variable Bit Rate (VBR) real-time service for each of four states which will be specified in greater detail herein. Once again, each of these values may be obtained from standards bodies such as ITU-T or measurements or research literature.

Finally, input 42 comprises a specification of the sojourn times for the ON and OFF states for each Variable Bit Rate (VBR) non-real-time service. As above, these values may be obtained from measurements, research literature or standards bodies such as the ITU-T.

These inputs, when combined in the manner which will be described in detail below, can be utilized to produce as output 44 a steady state probability for each service type which specifies the probability that a particular number of calls are in progress at a given time for each of the different service types. Additionally, output 46 illustrates the average sojourn time for each of the system states which may also be determined.

Figure 3:
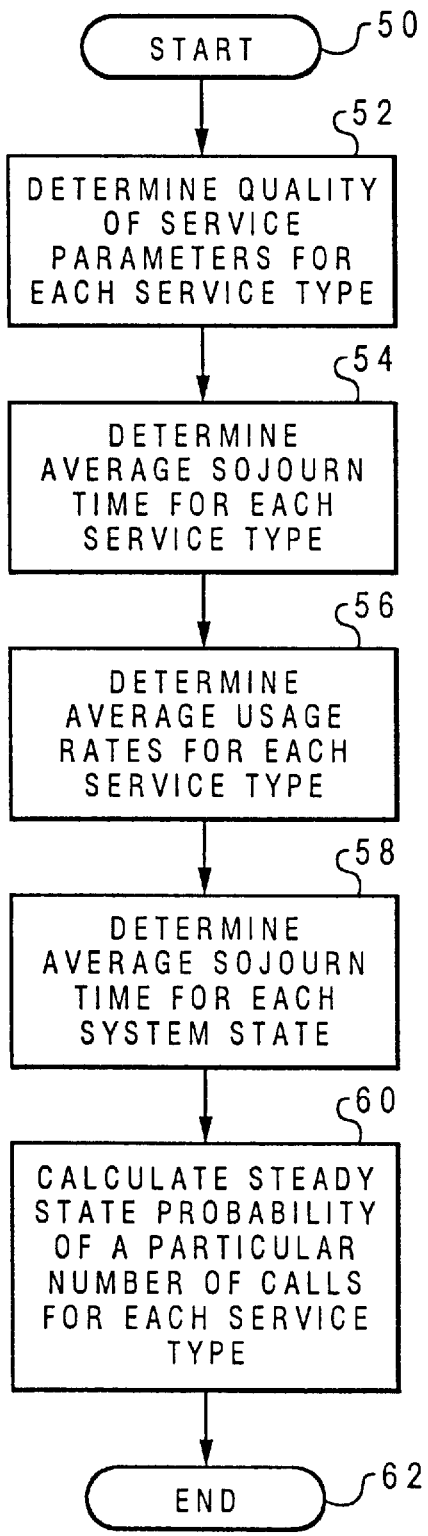
FIG. 3 is a high level flowchart of the method for modeling aggregate multimedia traffic within a shared transmission medium in accordance with the present invention.

Finally, with reference to FIG. 3, there is depicted a high level logic flowchart of the method for modeling aggregate multimedia traffic within a shared transmission medium in accordance with the present invention. As illustrated, the process at block 50 thereafter passes to block 52. Block 52 illustrates the determination of the quality of service parameters for each traffic source. As noted above, the network quality of service parameters for each traffic source include the maximum cell loss rate within the network, a maximum delay for a cell traversing the network and the maximum jitter that each cell experiences during network traversal. Each traffic source must specify the quality of service parameter values that the source expects from the network. These values, as noted above, can be determined by the individual sources or may be pre-determined by international standard bodies such as the ITU-T. Quality service of values are, as those skilled in the art will appreciate, standard parameters that all of the multimedia network expect from the various traffic sources.

Next, referring to block 54, the process determines the average sojourn time for each service type. This is accomplished for partitioning all traffic sources into one of three groups. Constant Bit Rate (CBR) traffic services, Variable Bit Rate (VBR) traffic service and Variable Bit Rate (VBR) non-real-time traffic services are identified. Those having skill in the art will appreciate that the quality of service parameters determined above may be utilized to partition services into one of these three groups.

After partitioning each traffic source into one of three groups, the Constant Bit Rate (CBR) traffic services are modeled as a Renewal Process. Those skilled in the art will appreciate that a Renewal Process is a generalization of the Poisson Process, which is a counting process for which the times between successive events are independent, identically distributed, exponential random values. The exponential interarrival distribution for the Constant Bit Rate (CBR) traffic services are characterized as having a mean time of $1/\lambda$ and a exponential sojourn distribution having a mean time of $1/\mu$.

Next, Variable Bit Rate (VBR) real-time traffic services are modeled as a Modulated Discrete Process having four states. The four states are: the OFF state, the SCENE CHANGE state (I), the INTER-IMAGE state (P) and a INTRA-IMAGE state (B). Each of these states has its own sojourn distribution, mean time and variousness. The OFF state mean sojourn time is 1/OFF. The SCENE CHANGE mean sojourn time is defined as 1/I. The INTER-IMAGE mean sojourn is defined as 1/P and the INTRA-IMAGE mean sojourn time is defined as 1/B. Individual cells are transmitted continuously in the SCENE CHANGE, INTER-IMAGE and INTRA-IMAGE states. No cells are transmitted in the OFF state. As an approximation time is assumed to be continuous (that is not discrete). The present model assumes that the OFF and the SCENE CHANGE states have a Weibbull distribution, the INTER-IMAGE has a Linear Regression distribution and the. INTRA-IMAGE state has a discrete Auto Regressive distribution.

Next, the Variable Bit Rate (VBR) non-real time traffic service are modeled as an ON and OFF Process having an exponential sojourn distribution in the ON state with a mean time of 1/ON and an exponential sojourn distribution in the OFF state having a mean time of 1/OFF. The values of the sojourn mean times can be obtained, as set forth above, from measurements, research literature or from standards bodies such as the ITU-T.

Next, as depicted in block 56, the average usage rates for each service type are determined from the average sojourn times determined above, with respect to block 54. Namely, for a Constant Bit Rate (CBR) traffic source the actual usage bit rate is assumed to be 100%. For Variable Bit Rate (VBR) real-time traffic services the actual usage rate is presumed to be $$\frac{1/I}{(1/I) + (1/P) + (1/B) + (1/OFF)}$$

For variable Bit Rate (VBR) non-real-time traffic services actual usage rates are presumed to be $$\frac{1/ON}{(1/ON) + (1/OFF)}$$

Next, referring to block 58, the average sojourn time is determined for each system state. Thus, if it is assumed that there are K services, where K is greater than or equal to 1 a system state is defined as a tuple $(n_i, n_2 \ldots n_k)$ that specifies that there are $n_1$ calls in progress, $n_2$ calls in progress, . . . and $n_k$ calls in progress.

Next, aggregate traffic is modeled as a Modified Markov Modulated Poisson Process having several states. Each state is a tuple of the sizes of the various service bursts. Fore each state i, the sojourn time in state i is exponential with a mean sojourn time of $1/\lambda_1$. Cells are transmitted continuously in all of the above states except the OFF state. As an approximation, time is once again assumed to be continuous (that is not discrete).

Next, for each Constant Bit Rate (CBR) traffic service i, define the factor $\rho_i$, which is equal to $\lambda_i/\mu_i$. For each variable Bit Rate (VBR) real-time traffice service i, let $\mu_i, \lambda_i$ and $\rho_i$ be variables where $1/\mu_i$ is equal to $1/I_i$ and wherein $1/\lambda_1$ is equal to (actual usage rate for traffic source i)/$(\mu_i - \mu_i^*$ actual usage rate for traffic service i), and where $\rho_i$ is equal to $\lambda_i/\mu_i$.

Finally, for each Variable Bit Rate (VBR) non-real-time traffice service i, let $\mu_i, \lambda_i$ and $\rho_i$ be variables where $1/\mu_i$ is equal to $1/ON_i$, where $1/\lambda_i$ is equal to (actual usage rate for traffice service i)/$(\mu_i - \mu_i^*$ actual usage rate for traffic rate service i), where $\rho_i$ is defined to be equal to $\lambda_i/\mu_i$.

Next referring to block 60, the steady state probability of a particular number of calls for each service type is calculated. This is accomplished by letting S be a set of all possible system states, where $M_i$ is the maximum number of traffic sources for a service i. The steady state probability P $(n_i, n_2, \ldots n_k)$ that there are $n_1$ calls in progress, $n_2$ calls in progress . . . and $n_k$ calls in progress is defined as set forth below:

$$P(n_1, n_2, \ldots, n_K) = \frac{\Psi(n_1, n_2, \ldots, n_K)}{\sum_{(n_1, n_2, \ldots, n_K) \in S} \Psi(n_1, n_2, \ldots, n_K)}$$

Where:

$$\Psi(n_1, n_2, \ldots, n_K) = \prod_{i=1}^{K} \binom{M_i}{n_i} (\rho_i)^{n_i}$$

Upon reference to the foregoing, those skilled in the art will appreciate that by combining various portions of the different modeling techniques in a Modified Markov Modulated Poisson Process, the model described herein may be utilized to accurately describe the aggregate traffic originating from multiple heterogeneous sources that may have widely diverse traffic types and characteristics and which can be utilized to actually characterize a proposed network so that customer expectations and network efficiency may be maintained at high levels.

While the invention has been particularly shown and described with reference to a preferred embodiment, it will be understood by those skilled in the art that various changes in form and detail may be made therein without departing from the spirit and scope of the invention.

What is claimed is:

1. A method for modeling aggregate multimedia traffic within a shared transmission medium, said method comprising the steps of:

partitioning said aggregate multimedia traffic into constant bit rate services, variable bit rate real-time services and variable bit rate non-real-time services;

determining values for average and mean sojourn times for each type of service;

determining an average usage rate for each type of service utilizing said average sojourn times;

determining an average sojourn time for each system state utilizing said average usage rate; and modeling said aggregate multimedia traffic by determining a steady state probability that a particular number of calls are in progress for each type of service utilizing said average sojourn time for each system state and said average usage rates for each type of service.

2. The method for modeling aggregate multimedia traffic within a shared transmission medium according to claim 1 wherein said step of determining values for average and mean sojourn times for each type of service comprises the step of modeling each constant bit rate service as a renewal process.

3. The method for modeling aggregate multimedia traffic within a shared transmission medium according to claim 1 wherein said step of determining values for average and mean sojourn times for each type of service comprises the step of modeling each variable bit rate service as a multistate modulated discreet process.

4. The method for modeling aggregate multimedia traffic within a shared transmission medium according to claim 3 wherein said step of modeling each variable bit rate real-time service as a multistate modulated discreet process comprises the step of modeling each variable bit rate real-time service as a multistate modulated discreet process including an OFF state.

5. The method for modeling aggregate multimedia traffic within a shared transmission medium according to claim 3 wherein said step of modeling each variable bit rate real-time service as a multistate modulated discreet process comprises the step of modeling each variable bit rate real-time service as a multistate modulated discreet process including an OFF state, including a SCENE and CHANGE state.

6. The method for modeling aggregate multimedia traffic within a shared transmission medium according to claim 3 wherein said step of modeling each variable bit rate real-time service as a multistate modulated discreet process comprises the step of modeling each variable bit rate real-time service as a multistate modulated discreet process including an INTER-IMAGE state.

7. The method for modeling aggregate multimedia traffic within a shared transmission medium according to claim 3 wherein said step of modeling each variable bit rate real-time service as a multistate modulated discreet process comprises the step of modeling each variable bit rate real-time service as a multistate modulated discreet process including an INTRA-IMAGE state.

8. The method for modeling aggregate multimedia traffic within a shared transmission medium according to claim 1 wherein said step of determining values for average and mean sojourn times for each type of service comprises the step of modeling each variable bit rate non-real-time service as an ON-OFF process.

9. A system for modeling aggregate multimedia traffic within a shared transmission medium, said system comprising:
    means for partitioning said aggregate multimedia traffic into constant bit rate services, variable bit rate real-time services and variable bit rate non-real-time services;
    means for determining values for average and mean sojourn times for each type of service;
    means for determining an average usage rate for each type of service utilizing said average sojourn times;
    means for determining an average sojourn time for each system state utilizing said average usage rates; and
    means for modeling said aggregate multimedia traffic by determining a steady state probability that a particular number of calls are in progress for each type of service utilizing said average sojourn time for each system state and said average usage rates for each type of service.

10. The system for modeling aggregate multimedia traffic within a shared transmission medium according to claim 9 wherein said means for determining values for average and mean sojourn times for each type of service comprises means for modeling each constant bit rate service as a renewal process.

11. The system for modeling aggregate multimedia traffic within a shared transmission medium according to claim 9 wherein said means for determining values for average and mean sojourn times for each type of service comprises means for modeling each variable bit rate real-time service as multistate modulated discreet process.

12. The system for modeling aggregate multimedia traffic within a shared transmission medium according to claim 11 wherein said means for modeling each variable bit rate real-time service as a multistate modulated discreet process comprises means for modeling each variable bit rate real-time service as a multistate modulated discreet process including an OFF state.

13. The system for modeling aggregate multimedia traffic within a shared transmission medium according to claim 11 wherein said means for modeling each variable bit rate real-time service as a multistate modulated discreet process comprises means for modeling each variable bit rate real-time service as a multistate modulated discreet process including an OFF state, including a SCENE and CHANGE state.

14. The system for modeling aggregate multimedia traffic within a shared transmission medium according to claim 11 wherein said means for modeling each variable bit rate real-time service as a multistate modulated discreet process comprises means for modeling each variable bit rate real-time service as a multistate modulated discreet process including an INTER-IMAGE state.

15. The system for modeling aggregate multimedia traffic within a shared transmission medium according to claim 11 wherein said means for modeling each variable bit rate real-time service as a multistate modulated discreet process comprises means for modeling each variable bit rate real-time service as a multistate modulated discreet process including an INTRA-IMAGE state.

16. The system for modeling aggregate multimedia traffic within a shared transmission medium according to claim 9 wherein said means for determining values for average and mean sojourn times for each type of service comprises the step of modeling each variable bit rate non-real-time service as an ON/OFF process.

* * * * *